(12) United States Patent
Lawson et al.

(10) Patent No.: US 6,247,426 B1
(45) Date of Patent: Jun. 19, 2001

(54) DISPOSABLE BIRDHOUSE

(76) Inventors: William J. Lawson; Jimmie Dell Lawson, both of P.O. Box 711, Poteet, TX (US) 78065

( * ) Notice: Subject to any disclaimer, the term of this patent is extended or adjusted under 35 U.S.C. 154(b) by 0 days.

(21) Appl. No.: 09/310,069

(22) Filed: May 11, 1999

(51) Int. Cl.[7] .................................................. A01K 31/00
(52) U.S. Cl. ........................................... 119/433; 119/428
(58) Field of Search .................................. 119/428, 433, 119/472, 473, 474

(56) References Cited

U.S. PATENT DOCUMENTS

| | | | |
|---|---|---|---|
| 1,587,804 | * | 6/1926 | Stein ..................... 119/428 |
| 5,740,762 | * | 4/1998 | Bennett ................. 119/428 |
| 5,943,981 | * | 8/1999 | Chrisco ................. 119/428 |
| 6,024,051 | * | 2/2000 | Simantob et al. ..... 119/474 |
| 6,067,938 | * | 5/2000 | O'Dell .................. 119/428 |

OTHER PUBLICATIONS http://www.shop-maine.com/naturecraft/nci_body.asp Cedar Birdhouses—North American Birds.
http://www.birdhouses.com/birdhouses/catolog.html Yankee Style Birdhouses—Cohasset Birdhouses Gift Shop.
http://www.pivot.net/~lebrunm/ Meadow Friends—Functional and Decorative Non-functional Birdhouses.

* cited by examiner

*Primary Examiner*—Charles T. Jordan
*Assistant Examiner*—Elizabeth Shaw
(74) *Attorney, Agent, or Firm*—Jackson Walker LLP

(57) ABSTRACT

A disposable cardboard birdhouse including a cardboard shell having rectangular walls and a roof, the shell having holes in the outer walls thereof for the birds to pass through. Smaller individual cardboard nesting boxes are stacked within the cardboard shells and holes in the nesting boxes align with holes in the shell to allow birds to come in and out of the disposable birdhouse. The entire birdhouse can be discarded at the end of the nesting season.

7 Claims, 4 Drawing Sheets

DISPOSABLE BIRDHOUSE

BACKGROUND OF THE INVENTION

1. Field of The Invention

Applicant's invention relates to a disposable birdhouse, more specifically a disposable birdhouse comprising a cardboard housing with cardboard nesting boxes located inside the housing.

2. Background Information

Birdhouses make attractive accessories for the home and garden. Further, birds are beneficial, for example, in providing nesting to birds, which are helpful in keeping the insect population in check.

Birdhouses come in a wide variety of sizes and shapes and are made from a number of different natural and synthetic materials. Typically, birdhouses are designed to be long lasting and attractive. They are often mounted outside on a vertical, in ground pole or from a tree. The birdhouse size, diameter of the entrance hole and its location are typical factors that govern the success of attracting and keeping cavity-nesting birds in the birdhouse. For example, Meadow Friends™ sells a functional and non-decorative birdhouse (www.pivot.net-ledrumn) called the "Victoria Delight" that measures 6 inches tall by 6 inches wide with a single hole centrally located on the front wall. It is suitable for swallows, phoebes, and sparrows.

Another example of commercially available birdhouses comes from Yankee-Style™ Birdhouses of Cohasset, Mass. Yankee offers a number of birdhouses in a variety of styles including the "Yankee Two-Decker," which is a two-story birdhouse sized 11 inches wide by 16 inches tall, with two holes, one above the other. It is designed to be mounted atop a pole or hung from a tree. Yankee also offers a "Colonial High Living" birdhouse which is mounted on a post. This birdhouse is 27 inches wide by 19 inches tall and contains apartments for 6 birds in the front and 6 in the back. The Yankee birdhouses are made of painted wood and are currently priced in the $100–$200 range.

Other birdhouses are made of cedar and have been designed for specific cavity-nesting birds found in North America.

This is just a brief illustration of the wide variety of birdhouses currently available. Prior art birdhouses are designed to be durable and long lasting. They are typically made of treated or painted wood and securely fastened together with nails or screws. Such sturdy construction allows the birdhouse to survive years of rain, wind, and sun and still provide accommodating housing for our feathered friends. However, such high quality construction comes at a price, and current birdhouses are not inexpensive. Moreover, they are often provided to the consumer in an already built form, which represents a bulky item to ship, or they come broken down, in which case the consumer has the occasional daunting task of building the structure.

What has heretofore been unavailable is a disposable, inexpensive, easily shipped and easily consumer-built birdhouse, all of which advantages are provided in Applicant's unique, novel, disposable birdhouse. More particularly, Applicant has provided a birdhouse constructed from folded cardboard. The birdhouse is shipped "broken down," much like a cardboard box can be broken down, and is therefore easy to ship. It is also disposable and designed to last about a season, after which it may be disposed. Disposability is desired if one wants to avoid the necessity of the seasonal cleaning of the birdhouse. In other words, at the end of the season, the birdhouse is simply discarded, along with the contents of the birdhouse and a new one is put in its place.

Applicant provides for these and other advantages in a birdhouse having a cardboard shell, the cardboard shell having wall members hingedly attached one to the other along seams connecting one wall to an adjacent wall (like a cardboard box). Moreover, Applicant's cardboard shell provides space in which to stack a number of individual nesting boxes, each nesting box having a hole in a front wall thereof to communicate to the outside of the cardboard shell and each nesting box providing an "apartment" for a cavity-nesting bird. Further, Applicant's unique disposable birdhouse includes a cardboard roof for fastening to the housing shell, the roof, housing shell, and nesting boxes all being made of cardboard which may be painted.

SUMMARY OF THE INVENTION

It is an object of the present invention to provide a disposable bird house, made of cardboard, which can be shipped in a flattened position and unfolded and fastened together by the consumer.

It is another object of the present invention to provide an inexpensive, easily-assembled, disposable birdhouse that will last about a season.

It is another object of the present invention to provide for a birdhouse made of cardboard which is attached along hinged edges, capable of receiving, at the interior of the cardboard, a multiplicity of smaller cardboxes, which smaller boxes act as an "apartment" for the nesting bird, and each box which is attached to the outside of the birdhouse through a hole through which the bird may enter and leave.

Other objects of the present invention are provided in a birdhouse comprising a rectangular cardboard shell and a multiplicity of cardboard nesting boxes which may be shipped in a flattened condition and folded together by the consumer.

DETAILED DESCRIPTION OF THE PREFERRED EMBODIMENT

Figure 1:
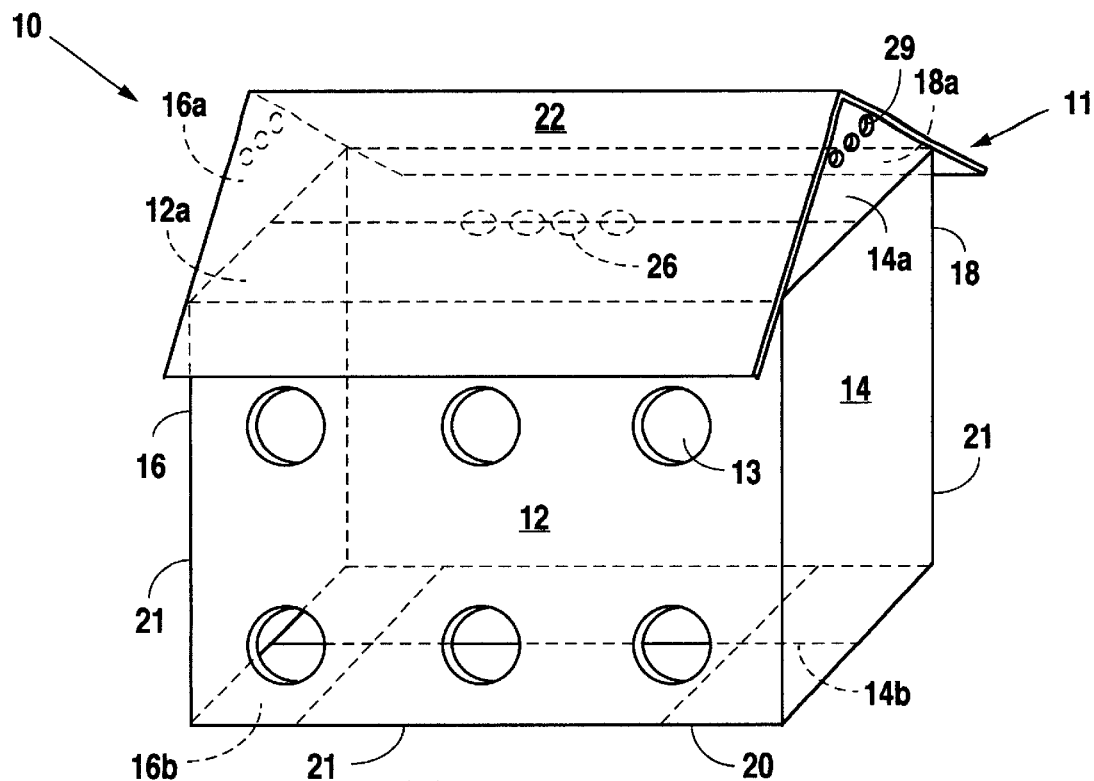
FIG. 1 illustrates a perspective view of the birdhouse, more particularly the birdhouse housing shell, illustrating the holes in the front wall of the housing shell, the vent holes and other features.

FIGS. 1 through 6 illustrate a preferred embodiment of Applicant's birdhouse 10. The birdhouse includes a birdhouse housing shell 11 which includes a roof 22. The interior of the housing shell has stacked within it a multiplicity of rectangular, walled, cardboard nesting boxes 24. Each nesting box provides an apartment for a bird and is open with hole 26A therein, which hole aligns with holes 26 in the outer wall or walls of the housing shell 11 to allow a bird entrance into the apartment provided by the nesting box.

Applicant's housing shell 11 is a common corrugated cardboard box having preferred dimensions to accomodate two to twenty-four, or more individual smaller boxes, which may be 6 inches×6 inches×6 inches, 5 inches×5 inches×5 inches, 4 inches×4 inches×4 inches, or other sizes commonly available.

Housing shell 11 includes a rectangular front wall 12 having flaps 12A and 12B hingedly attached to the front wall, at the top and bottom, just as a cardboard box has a top flap and a bottom flap, which is attached along a seam made of cardboard, which allows the flaps to pivot. Applicant's housing shell 11 includes a right side wall 14, which side wall has flaps 14A and 14B, one on the top and the other on the bottom; again, like flaps attached to a cardboard box which is capable of folding up flat, which, through the use of flaps, can be constructed into a three dimensional container. Opposite side wall 14 is left side wall 16, which is similarly dimensioned and has left side wall flaps 16A and 16B which, again, are pivotally attached to the side wall and can fold together in the nature of a cardboard box.

Rear wall 18 has top and bottom mounted rear wall flaps 18A and 18B also hingedly attached like the flaps on the front wall and two side walls. The effect of using four walls hingedly attached with each wall having a pair of flaps is to provide for a cardboard structure that can be shipped flat, but folded together, as illustrated in FIG. 1.

Birdhouse shell 11 also includes a bottom 20 which is made from one or more of the front, right side walls, left side walls, or rear walls which are either taped, glued or folded together when the house is built.

Figure 2:
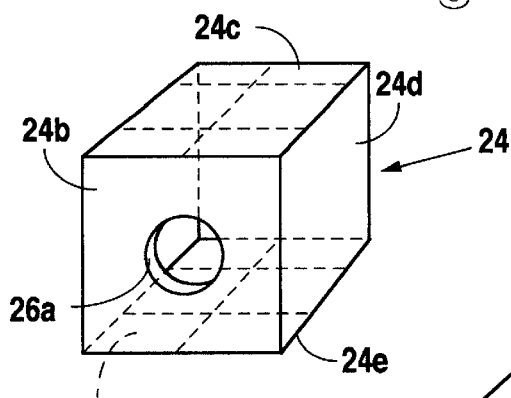
FIG. 2 illustrates a perspective view of a nesting box, the nesting boxes for stacking in the interior of the birdhouse housing shell illustrated in FIG. 1 such that the holes in the front wall of the housing shell are aligned with the holes in the front wall of the nesting box.
Figure 3:
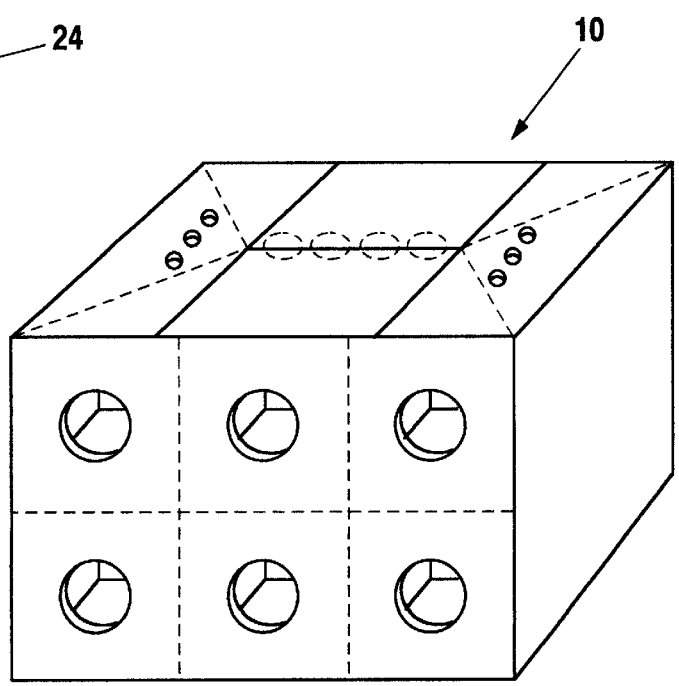
FIG. 3 illustrates a perspective view of the housing shell of Applicant's present invention, indicating dimensions thereon and showing the flap portions of the front rear and side walls.
Figure 4:
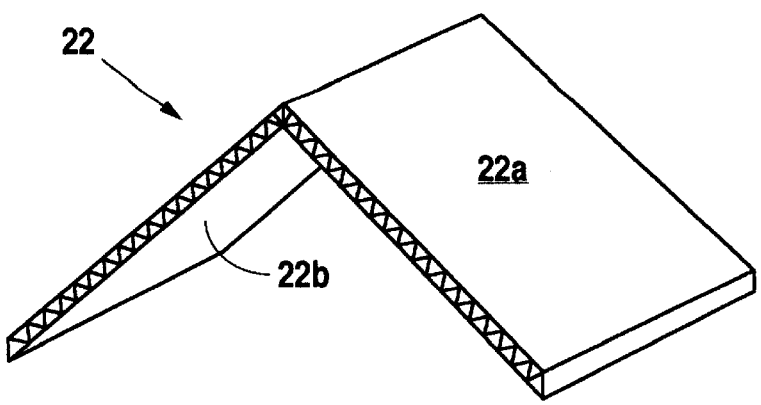
FIG. 4 is a perspective view of the roof portion of Applicant's birdhouse removed from the birdhouse itself.

It can be seen with reference to FIGS. 2 and 3 that the two side wall flaps 14A and 16A can be cut and trimmed along a diagonal and be provided with vent holes. After they are cut, they can be rotated to align with the same plane as the rest of the side walls and roof 22, which is angled to match the pitch of the cut made in the flaps, can be glued, taped, or otherwise fastened to the two trimmed side wall flaps 14A and 16A. The roof can also be glued or taped where it meets the top upper edge of the front and rear walls. Hot glue or contact cement has been found to be best.

Nesting boxes 24 are stacked inside the interior of housing shell 11 in a uniform manner, typically in two rows per side. Birds can come in and out of the nesting boxes through holes 26A in the front walls 24B of the nesting boxes which match up with holes 13 in the front and rear walls of shell 11. An example of an arrangement of boxes as placed in the interior of the shell, can be found in FIG. 5. Here it is seen that, viewed from the top, two rows of three boxes can be observed; one row of three boxes facing forward so they open to the front wall, and a second row of three boxes facing rearward to face the rear wall. Under these rows are a second pair of identically dimensioned and placed boxes.

Figure 5:
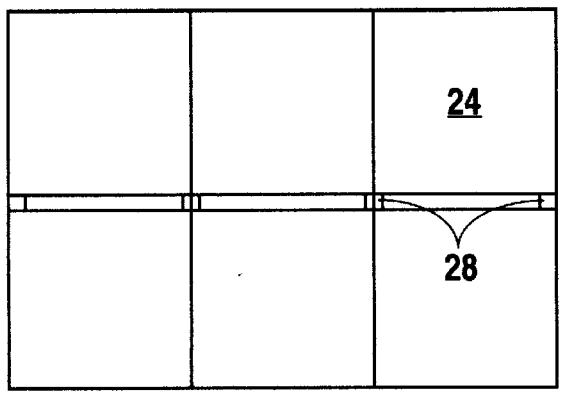
FIG. 5 illustrates a top elevational view of Applicant's birdhouse housing shell with the roof removed and the flap opened so it is apparent how the individual nesting boxes are stacked and arranged within the interior of the housing shell.
Figure 5A:
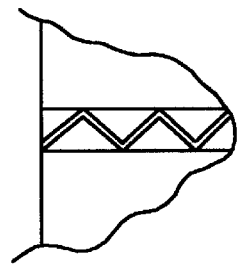
FIG. 5A is a cut away, top elevational view of FIG. 5, but showing the use of a wave-shaped corrugated sheet in place of the square spaces.
Figure 6:
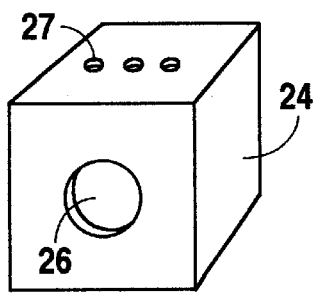
FIG. 6 is another view of the nesting box illustrating the vent holes and the entrance hole therein.

FIG. 5 also illustrates the use of spacers 26, which can be simple 1 inch by 1 inch corrugated square section tubes which can slide down into the positions indicated to keep the nesting houses firmly pressed against the respective front and rear walls, but also which allow the vent holes 26B in the rear of the nesting house to function. That is, the air can circulate through the vent holes 26B in the nesting box through vent holes 27 and can move up and out through vent holes 29 in the peak of the roof (see FIG. 1). This allows circulation of air through the nesting boxes. Also, wave shaped sheets of appropriate size may be used to maintain separation between the rear walls of the nesting boxes (see FIG. 5A).

The dimensions for the nesting boxes may be 6 inches by 6 inches by 6 inches. This would be suitable for a Martin, for instance. Indeed, the house illustrated with six apartments on one side and six on the other (12 total), and dimensioned as they are, are suitable for Martins. However, other arrangements are possible.

As seen with reference to FIG. 2, nesting boxes 24 include side walls 24A, front wall 24B (with hole 26A therein), top wall 24C, rear wall 24D, and bottom wall 24E. Further, flaps attached to the front walls and/or side walls and/or back walls may be used to hold the boxes up and create a bottom and top wall 24E and 24C in the same way cardboard boxes may be laid flat for shipping, but folded together into three dimensional structures. That is, the nesting boxes, like housing shell 11 are constructed with walls that are hingedly attached to one another and flaps which are hingedly attached to the walls which flaps are used to make the top and bottom, in a manner that the entire structure could be laid down and shipped flat and then folded together and secured with the use of tape or glue, as needed. When the entire structure in completed, it can be brush or spray painted with an appropriate coating such as non-toxic latex paint, paraffin, or wax which will help weatherproof the structure. It may then be mounted outside on a post or pole or hung from an appropriate support to provide a inexpensive but durable, easy to manufacture, and disposable birdhouse.

Figure 7:
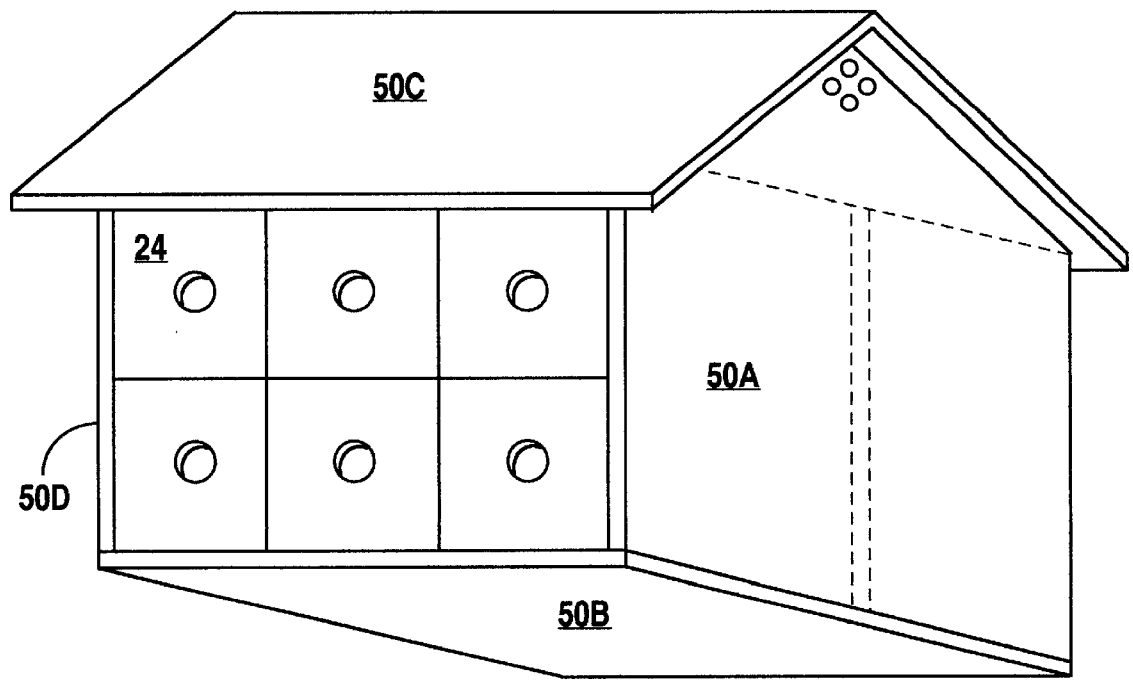
FIG. 7 is a side perspective view of a wood frame alternative preferred embodiment of Applicant's present invention.

FIG. 7 illustrates an alternative preferred embodiment of Applicant's present invention. This embodiment 10A has a wood shell with two wood side walls 50A in a rectangular shape with a wood floor bottom 50B, as well as a wood roof 50C. Six to twelve cardboard nesting boxes can be inserted from the open front or rear 50D and stacked one on top of the other in a uniform arrangement to provide apartments for the cavity-nesting birds to nest in, just as the previous embodiment made of cardboard features.

In another alternate preferred embodiment of a rectangular wood shell having a wood floor, four wood side walls and a wood roof, the wood roof being detachable to be able to stack the nesting boxes inside. The cardboard nesting boxes will have holes in them, as will a pair of the wood side walls, the holes to allow the birds to come in and out of the nesting boxes. In both of the embodiments set forth, it is typical to have the holes in the housing slightly larger than the holes in the boxes so there will not be problems with alignment. In other words, this prevents the problem of stacking boxes inside the shell and finding there is misalignment between the holes in the nesting boxes and the holes in the walls of the shell.

FIG. 7 provides for a permanent wooden shell in which cardboard nesting boxes are installed, rather than having a shell being made of a disposable, throw-away material, such as corrugated cardboard, as set forth in the embodiments featured in FIGS. 1 through 6. Indeed, the alternate preferred embodiment of FIG. 7 (wood shell) may even work for one or two nesting boxes, or a single nesting box made of cardboard and the shell made of wood.

In the case of the wood shell embodiment, only the nesting boxes would be discarded at the end of the season, the wood shell typically surviving for a number of years. The utility of this embodiment is still the same, at least in so far as the disposability of the nesting boxes at the end of the nesting season.

Figure 8:
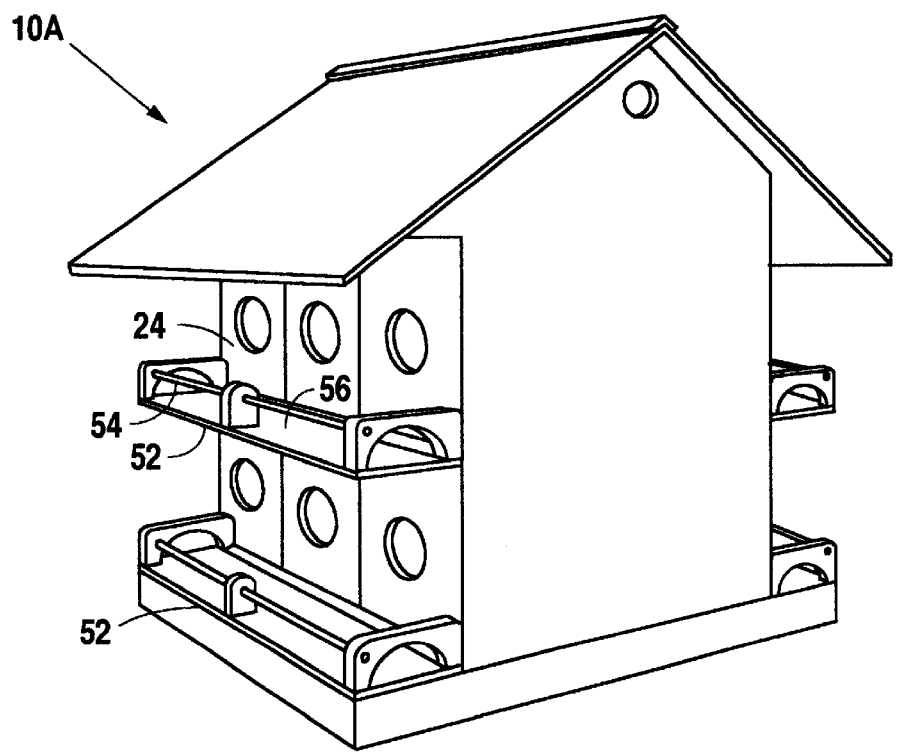
FIG. 8 is a side perspective view of another variation of the alternate preferred embodiment of Applicant's present invention as set forth in FIG. 7.

FIG. 8 is another illustration of the partially wooden shell which has no front or back panel, just a pair of wood sides, a wood base, and a wood roof. Individual cardboard nesting boxes 24 are stacked inside, with holes cut-out for bird entry, also holes cut-out in the rear of the boxes for ventilation. Note also that part of the wood base includes an upper and a bottom porch 52 and railing or perch 54. The upper portion railing has a thin board 56 that slides in between the lower row of boxes and the upper row of boxes. A third floor could be added with another slide-in porch.

Figure 9:
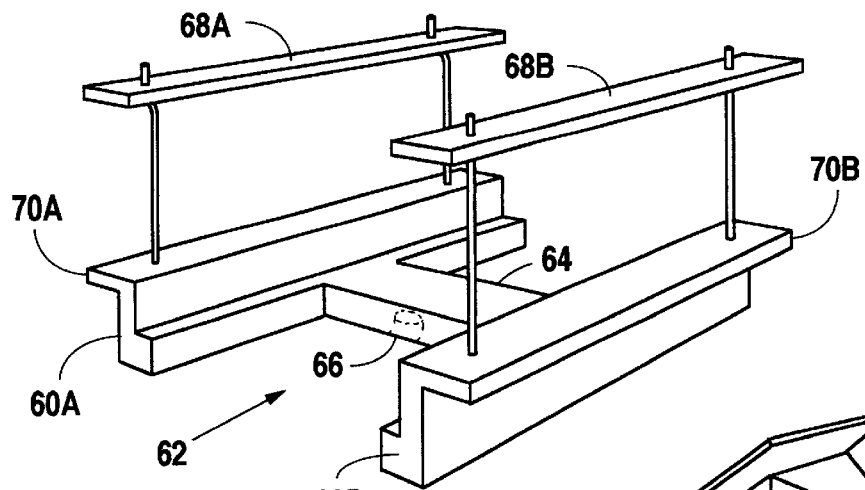
FIG. 9 is a side perspective view of a wooden holder for use with Applicant's disposable birdhouse.

FIG. 9 illustrates a permanent wooden holder 58 for use with the disposable cardboard birdhouse. The birdhouse could be set in the permanent wooden holder, which features two longitudinal members 60A and 60B acting as base 62, the base including a cross member 64. The holder may also have a mounting notch 66 on the base of the cross member for mounting on a pole. Note also that coming off the two longitudinal leg members are a pair of porches 68A and 68B such that when the cardboard box is sitting in the holder, the longitudinal basis of the porch members are just below the second tier of holes. Indeed, the two longitudinal base members include built-in porches 70A and 70B.

Figure 10:
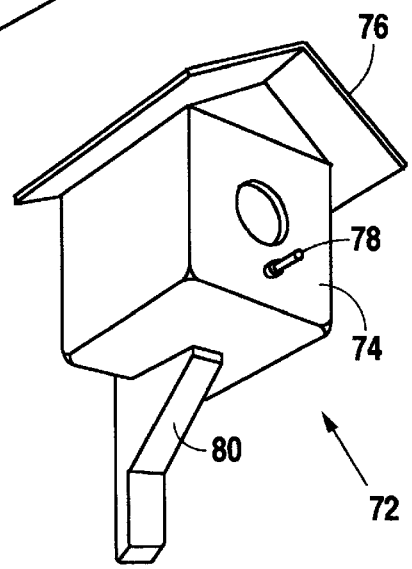
FIG. 10 is a bottom perspective view of a single individual birdhouse as an alternate preferred embodiment of Applicant's present invention.
Figure 11B:
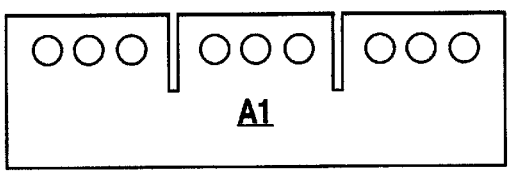
FIGS. 11a through 11d illustrate cardboard sheets which are fitted together to form individual nesting houses within the wooden shell of Applicant's alternate preferred embodiment.
Figure 11C:
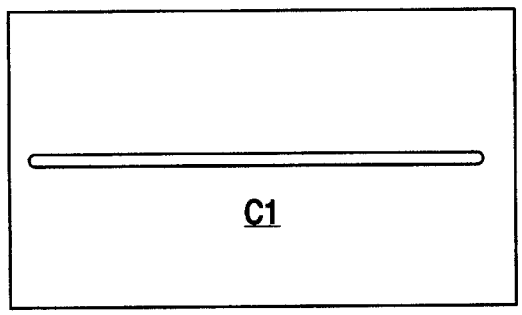
Figure 11A:
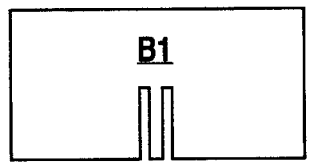
Figure 11D:
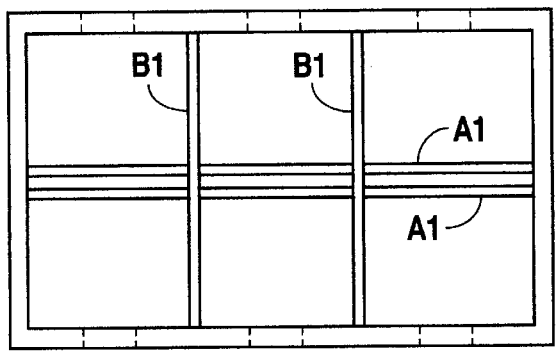

FIG. 10 is an alternate preferred embodiment 72 of a single, individual birdhouse with a cardboard shell 74 and cardboard roof 76 which has been coated with paraffin and includes a wooden mounting foot perch 78, as well as wood mounting bracket 80.

FIGS. 11A, 11B, 11C, and 11D illustrate an alternate preferred embodiment for providing interior rooms for individual nesting areas to the Applicants', birdhouse. In the earlier embodiment, individual boxes were featured. However, in this alternate preferred embodiment flat cardboard sheets may be slotted together to form rooms. It can be seen that a pair of cardboard sheets A1 may be slotted and ventilated and used as rear walls to set on a wood or cardboard floor C1 (cardboard) here being vented when used between floors of cardboard nesting rooms. Cardboard side walls B1 are notched vertically together with rear walls A1 at a perpendicular angle with one wall standing vertically as a rear wall to form rooms with a floor C1 between the two sets of rooms, which floor has a slot for ventilation therebetween. In this embodiment, you obviously do not need to use individual boxes and the hole cut in outer wall of the shell is sufficient to allow entry into the room. Further, this embodiment is somewhat simpler to build as it only uses several flat sheets notched out to interlock with one another and the floor.

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

What is claimed is:

1. A birdhouse comprising:
   a rectangular cardboard housing shell including a roof, a rectangular front wall having at least one flap portion, two rectangular side walls, each side wall having at least one flap portion, a rear wall having at least one flap portion, the front wall, rear wall and side walls hingedly joined one to the other and made of corrugated cardboard wherein at least one wall has holes therein for the birds to pass through; and
   a multiplicity of cardboard rectangular nesting boxes dimensioned to fit within the cardboard housing, each box having walls and each box having wall with a hole therein for the birds to pass through such that the holes in the shell align with the holes in the nesting boxes.

2. The birdhouse of claim 1 wherein the walls of the housing shell and the walls of the nesting boxes include vent holes.

3. The birdhouse of claim 1 further including a spacer to help urge the nesting boxes against the front and rear walls respectively of the housing shell.

4. The birdhouse of claim 1 wherein the rectangular shell includes walls dimensioned to give an overall length of between 12 and 38 inches, width of between 6 and 26 inches, and a height of between 6 and 30 inches.

5. The birdhouse of claim 1 wherein the housing shell includes a paint or wax covering.

6. A birdhouse comprising:
   a rectangular shell made of two wooden walls and including a wood roof and a wood floor;
   a multiplicity of cardboard rectangular nesting boxes dimensioned to fit within the wood housing, each box having walls and each box having a wall with a hole therein for the birds to pass through;
   a spacer to urge the front walls of the boxes against at least one of the inner walls of the housing; and;
   wherein at least one of the wood walls has a multiplicity of holes therein for the birds to pass through such that the multiplicity of boxes may be stacked and fitted within the wood housing such that the holes in the wood boxes align with the holes in the wood housing.

7. The birdhouse of claim 6 further including vent holes in the nesting boxes and vent holes in at least one wall of the housing.

* * * * *